July 14, 1931.  F. PARNELL  1,814,008
CANDY MACHINE
Filed Dec. 12, 1929  4 Sheets-Sheet 1

INVENTOR
Fred Parnell.
his Attorney

July 14, 1931.  F. PARNELL  1,814,008
CANDY MACHINE
Filed Dec. 12, 1929   4 Sheets-Sheet 2
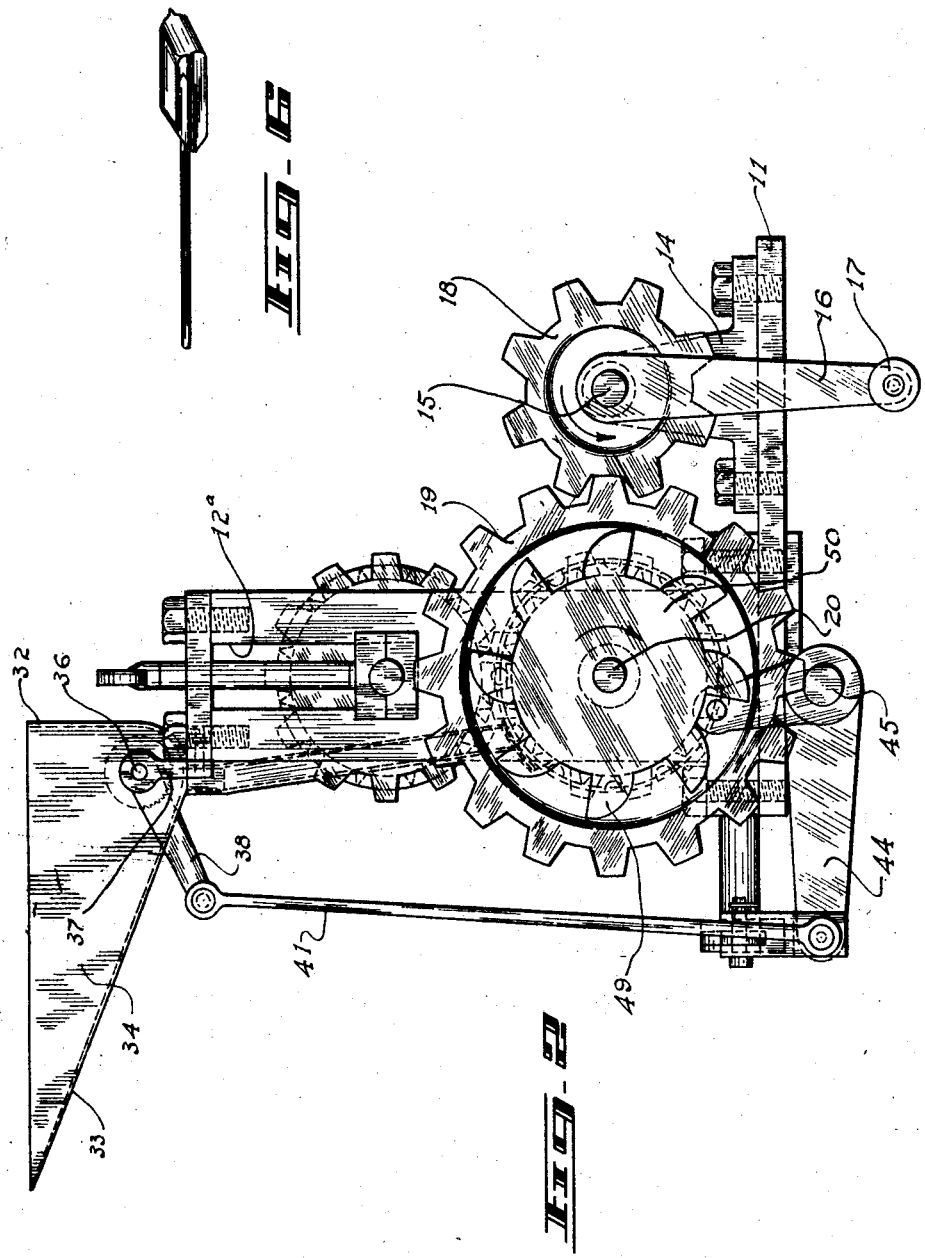
INVENTOR
Fred Parnell
his Attorney

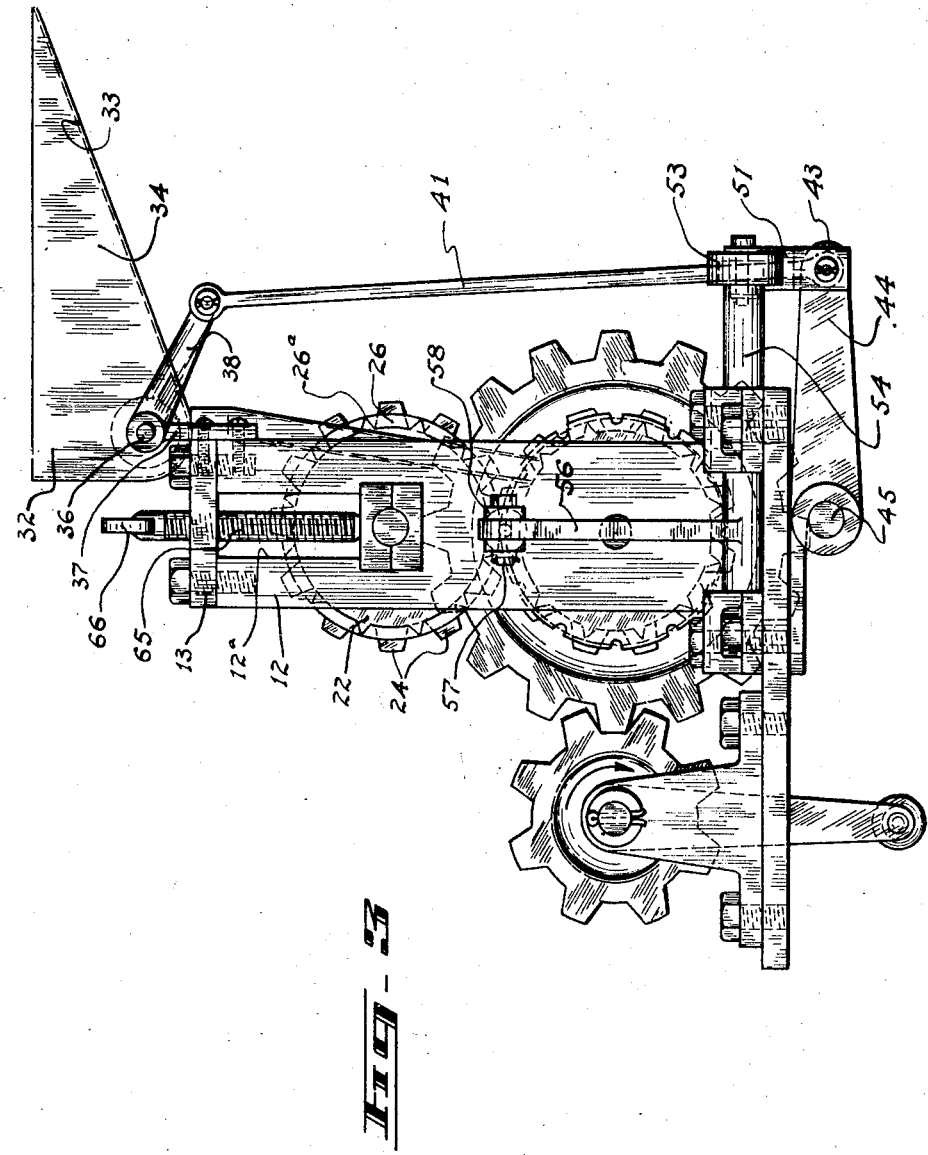

July 14, 1931.　　　F. PARNELL　　　1,814,008
CANDY MACHINE
Filed Dec. 12, 1929　　4 Sheets-Sheet 4
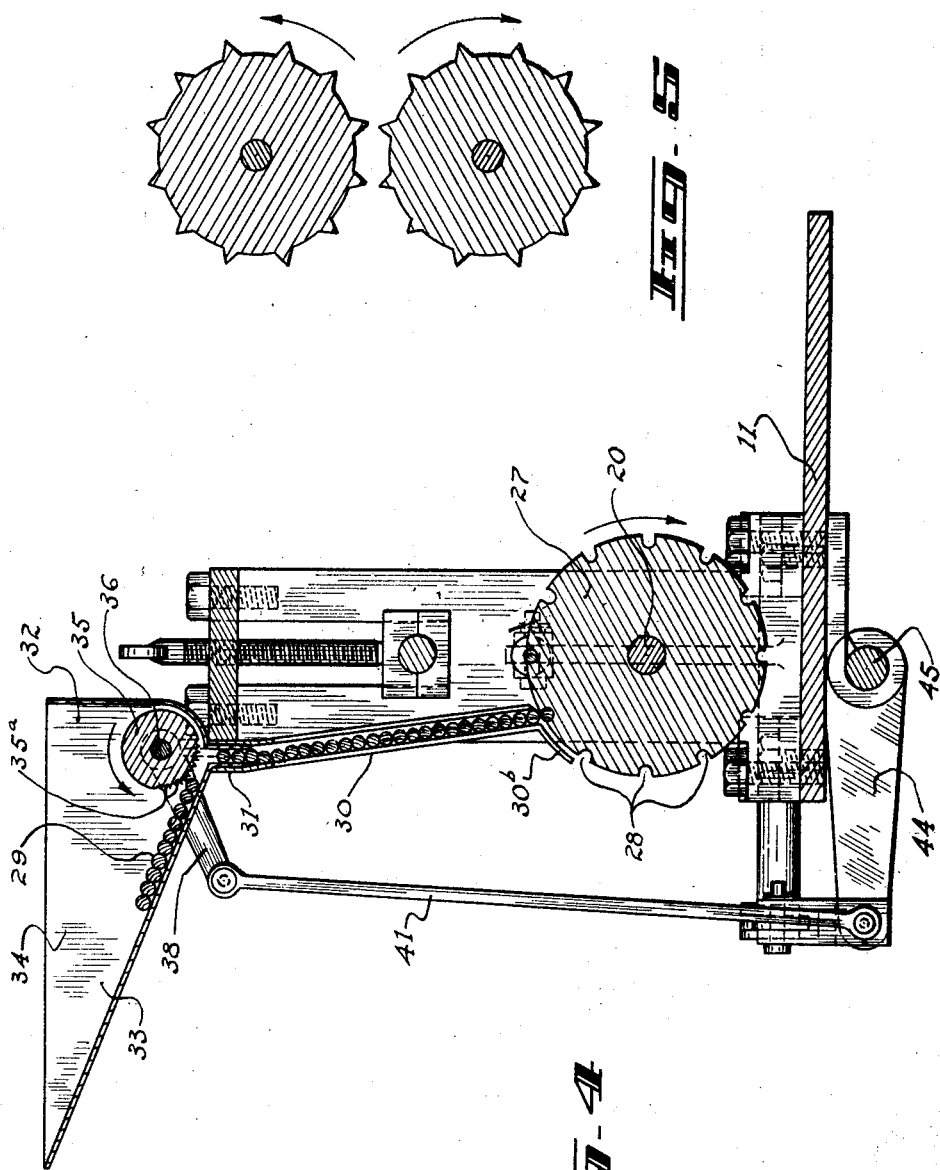
INVENTOR
Fred Parnell
His Attorney

Patented July 14, 1931

1,814,008

UNITED STATES PATENT OFFICE

FRED PARNELL, OF MEDICINE HAT, ALBERTA, CANADA

CANDY MACHINE

Application filed December 12, 1929, Serial No. 413,589, and in Canada August 6, 1929.

This present invention relates to certain new and useful improvements in a candy machine.

The primary object of the invention resides in the provision of a candy machine particularly designed for producing lollipops or all-day-suckers.

Another object of the invention resides in the provision of a candy machine of the character stated which will automatically form or shape the candy product and position the handle or stick therein.

A further object of the invention resides in the provision of a candy machine of the character stated which will automatically produce and deliver the finished candy products in rapid succession.

A still further object of the invention resides in the provision of a candy machine of the character stated which will produce uniform candy products with a handle or stick firmly secured in each product as the same is shaped and trimmed.

The invention has for a still further object the provision of a candy machine of the character stated in which the handles or sticks are continuously fed to position opposite the moulds for the candy products and forced into the latter during forming and shaping thereof.

A still further object of the invention resides in the provision of a candy machine of the character stated which is completely automatic with all of the operative parts synchronized for properly timed operation.

A still further object of the invention resides in the provision of a candy machine of the character stated which is of simplified and improved construction and operation and increased efficiency as well as inexpensive to manufacture.

A still further object of the invention resides in the provision of a candy machine of the character stated which may be readily operated either manually or by automatic operating means as a power driven machine to form the body or candy portion of the product and at the same time force the handle or stick into the same so that when the body or candy portion is formed and shaped or trimmed, it is delivered from the machine with the handle or stick secured therein.

A still further object of the invention resides in the provision of a candy machine of the character stated in which the body or candy portions of the products are formed in opposed complementary mould sections on co-operating drums and the handles or sticks are forced into the end of the body or candy portion of the products as they are completed and the edges trimmed or cut off by the longitudinal walls of the mould sections, so that the products are delivered from the machine in completed condition.

A still further object of the invention resides in the provision of a candy machine of the character stated in which the handle or stick feeding mechanism and the mechanism for forcing the handles or sticks into the body or candy portions of the product and all other operative mechanism of the machine work in unison and synchronism with the main shaft of the machine, from which they are driven.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings, forming a part of this disclosure, wherein like characters indicate like parts throughout the several views.

In the drawings:—

Figure 2 is an end elevation thereof;

Figure 3 is an end elevation looking at the opposite end of the machine;

Figure 4 is a transverse vertical section, taken substantially on the plane of line 4—4 of Figure 1, looking in the direction indicated by the arrows;

Figure 5 is a transverse vertical section, taken substantially on the plane of line 5—5 of Figure 1, looking in the direction indicated by the arrows; and Figure 6 is a detail perspective of the finished product delivered from the machine.

Figure 1:
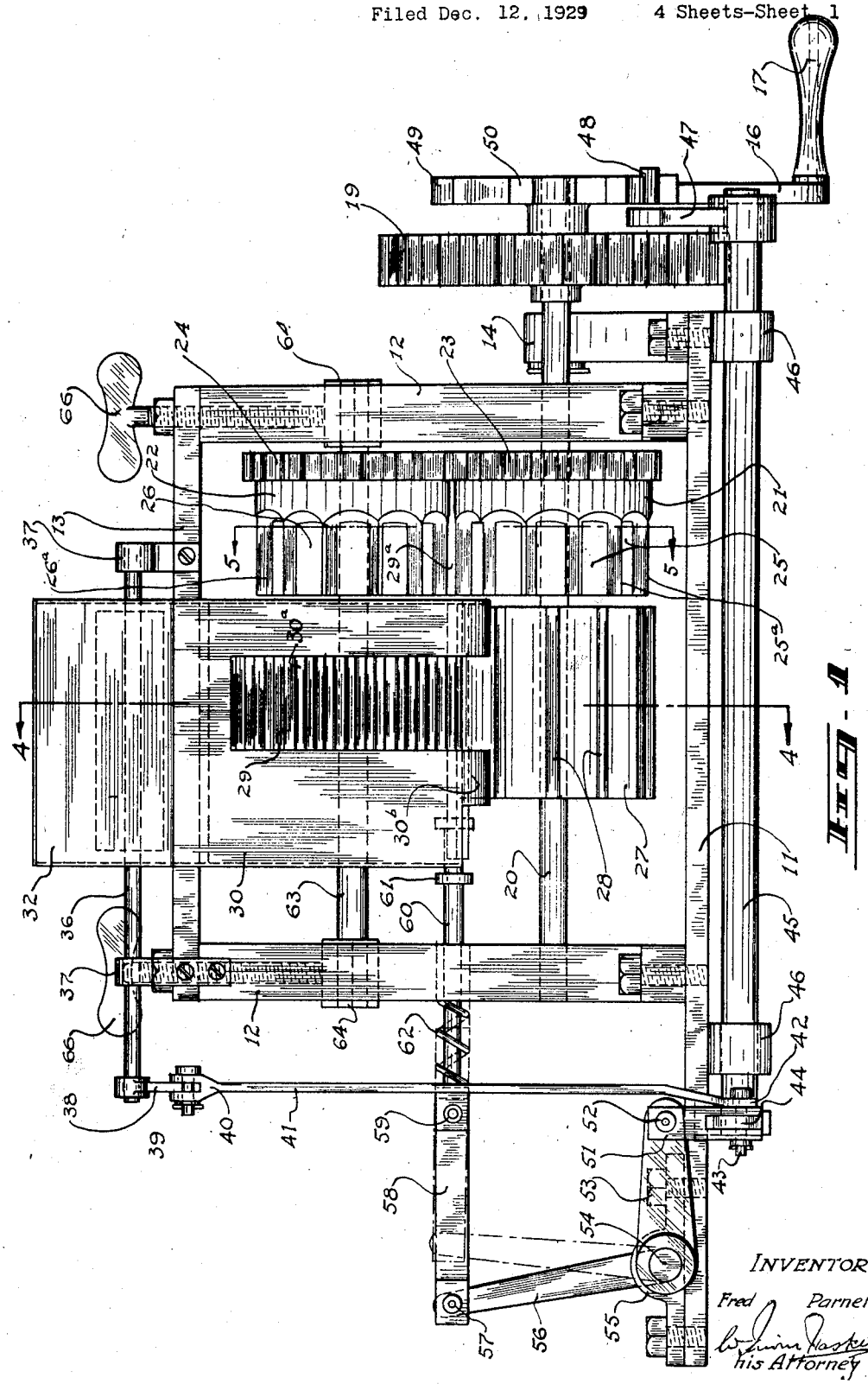
Figure 1 is a side elevation of the complete machine.

Referring more in detail to the drawings, it is to be noted that the machine includes a base 11 on which are mounted the main end standards 12 connected at their upper ends by the connecting bar 13. A bearing standard 14 is also mounted on the base 11 with the power shaft 15 rotatably mounted in the upper end thereof and adapted to be rotated by the operating crank 16 having a crank handle 17 on its free end. The power shaft 15 may be rotated by a power driving means or other driving means, if preferred. The power shaft 15 has a driving gear 18 carried thereon of substantially small diameter meshing with and driving the gear 19 of substantially large diameter, carried on the main shaft 20 of the machine. This main shaft 20 is rotatably mounted in the lower portion of the main standards 12. A drum 21 is carried on the main shaft 20 for co-operation with an upper drum 22 which are geared together by intermeshing gears 23 and 24 carried on one end of the drums 21 and 22, respectively. These drums 21 and 22 have formed in their peripherial faces complementary mould sections 25 and 26, respectively which are adapted to register in pairs to form complete moulds for the body or candy portion of the products produced by the machine. The longitudinal walls 25a and 26a of the mould sections 25 and 26, respectively, are beveled on their opposite faces to sharp edges so as to co-operate in trimming or finishing the edges of the products. The lower drum 21 has an extended solid portion 27 of large diameter with longitudinal grooves 28 extending the full length thereof in its periphery to receive handles or sticks 29 for the body or candy portions of the products formed in the moulds, one of the grooves 28 being opposite the centre of each mould section 25 in the drum 21.

The handles or sticks 29 are fed to the grooves 11 in succession by means of a slightly inclined magazine 30 which is suspended from the depending restricted mouth or discharge bottom 31 of the feed hopper 32, which feed hopper 32 is supported, together with the magazine 30, on one edge of the connecting bar 13 for the upper ends of the standards 12. From the restricted mouth or discharge bottom 31, the bottom wall 33 of the hopper is inclined outwardly to the outer corners of the hopper triangular sides 34. A feed roller 35 for the handles or sticks 29 is located transversely in the deep side of the hopper 32 with serrations 35a or corrugations extending longitudinally of a portion of the roller 35. This roller 35 is rigidly mounted on the roller shaft 36, which is rotatable through the hopper triangular sides 34 and supported in bearings 37 mounted on the connecting bar 13 and one of the standards 12. Projecting laterally from one extended end of the roller shaft 36 is the arm 38 having the pivot pin 39 extended transversely therethrough and also through the bifurcated upper end 40 of the upstanding arm actuating bar 41, the offset lower end 42 of which is mounted on the lower horizontal pivot pin 43 extended through the laterally projecting arm 44 provided on the lower longitudinal rock shaft 45. This rock shaft 45 operates in bearings 46 preferably depending from the base 11 and carries on its other end the rigidly mounted pawl 47 having a pin 48 extending laterally from its upper free end and normally engaged with the ratchet teeth 49 carried on the periphery of the ratchet wheel 50 which is rigid on the end of the main shaft 20, outwardly of the gear wheel 19. This ratchet wheel 50 is of a smaller diameter than the gear wheel 19 and the ratchet teeth 49 thereof are each provided with a straight wall extending radially from the ratchet wheel 50 and a curved or convex wall from the outer edge of each tooth 49 to the periphery of the ratchet wheel 50. It is therefore apparent that each tooth 49 of the ratchet wheel 50 will in turn operate on the pin 48 and force the latter away from the periphery of the ratchet wheel 50 as the tooth passes the pin 48, thus rocking the rock shaft 45.

Mounted on the pin 43 and straddling the arm 44 is the bifurcated lower end of the link 51 depending from the pin 52 which is extended laterally from the arm 53 projecting radially from the transverse horizontal rock shaft 54 operating in bearings 55 supported on the base 11, preferably at an extended end thereof. Inclined upwardly from the transverse horizontal rock shaft 54 at an angle to the plane in which the arm 53 is extended, is the comparatively long arm 56, carrying a pin 57 transversely in its upper end on which is mounted the bifurcated outer end of the plunger operating rod 58 having a similar pin 59 mounted transversely in its bifurcated inner end and carrying thereon the outer end of the plunger rod 60 having the enlarged and flattened head 61 on its free inner end. A spring 62 is positioned on the plunger rod 60 with its opposite ends bearing against the bifurcated inner end of the plunger operating rod 58 and on the outer face of the main standard 12 through which the plunger rod 60 reciprocates. As the link 51, arm 53, transverse rock shaft 54 and arm 56 carried by the latter are operated through the medium of rocking of the main longitudinal horizontal rock shaft 45, the plunger operating rod 58 is thus actuated to force the plunger rod 60 inwardly against the action of the spring 62 and which latter serves to resiliently return these operative parts to normal position. The plunger head 61 operates against the end of each handle or stick 29 as it rests within the uppermost groove 28 of the drum extension 27, to force the pointed end 29a of the handle or stick 29 into the body or candy portion of the lollipop as the shaping and trimming of the same is being completed between the drums 21 and 22. Feeding of the handles or sticks 29 may be constantly under the observation of the operator of the machine owing to the opening 30a extending downwardly in the side of the magazine 30 and danger of the handles or sticks 29 rolling out of the groove 28 in which they are successively deposited, is prevented by the arcuate extensions 30b of the lower edge of the slotted side of the magazine 30.

The upper drum 22 and the gear 24 carried thereby may be readily adjusted with respect to the lower drum 21 and the gear 23 carried by the latter, owing to the ends of the shafts 63 on which the upper drum 22 and gear 24 are rigidly mounted, being carried in bearings 64 which are adjustable in the bifurcated upper portions 12a of the main standards 12 and retained in their adjusted position therein by set screws 65 working through the connecting bar 13 and having heads 66 on their upper ends or other means by which the set screws 62 may be readily threaded through the connecting bar 13 for adjusting the position of the bearings 64 and thus regulating the tension of the upper drum 22 and the position thereof with respect to the lower drum 21.

As the construction of the device has thus been described in detail, brief reference is now had to its use and modus operandi: The handles or sticks 29 are supplied to the hopper 34 as required and are automatically fed from the same, by way of the magazine 30 to the grooves 28 in the lower drum extension 27 as the latter are successively presented to position beneath the magazine 30. The candy from which the body or candy portion of the lollipops are produced, is suitably fed to the mould sections 25 and 26 of the drums 21 and 22 respectively and moulded into proper shapes therein as they register, the longitudinal edges of the lollipops being suitably cut off or trimmed by the longitudinal walls 25a and 26a of the registering mould sections 25 and 26. As each lollipop body or candy portion is being thus moulded or shaped and trimmed, the handle or stick 29 therefor is forced by its pointed end into one end of said body or candy portion and as the drums 21 and 22 rotate to bring the following mould sections 25 and 26 successively into registration, the completed lollipop is discharged from the machine as a completed product. As the main shaft 20 is driven by the power shaft 15, the main rock shaft 45 will be rocked in one direction through the medium of the teeth 49 and the pawl 47 once, for each registration of the corresponding mould sections 25 and 26 of the respective drums 21 and 22, thus assuring operation of the plunger rod 60 on each handle or stick 29 presented opposite the same to force the pointed end of the handle or stick 29 into the body or candy portion of the lollipop formed in said registering mould sections 25 and 26. This rocking of the main rock shaft 45 also assures simultaneous operation of the upper rock shaft 36 with the handle or stick feeding drum 35 mounted thereon, so as to assure feeding of another handle or stick 29 from the hopper 34 into the magazine 30 to replace or compensate for the one discharged from the bottom of the magazine 30, thereby maintaining at all times the proper number of handles or sticks 29 in the magazine 30. This syncronizing of the operation of the various operative parts of the machine is assured by provision of the proper number and arrangement of the ratchet teeth 49 on the ratchet wheel 50 and also proper proportioning and arrangement of the various parts of the machine. The various operative parts of the machine actuated by the ratchet wheel 50 and the pawl 49 are automatically returned to normal position after each operation and resiliently maintained in such normal position by means of the spring 62 on the plunger rod 60. The machine will produce the maximum number of lollipops within a given time with the minimum expenditure of power and attention. Furthermore, as the operation is completely automatic, the operation may be continued indefinitely, without interruption and loss of time and possible loss of material due to frequent stopping and starting of the machine.

From the foregoing description taken in connection with the accompanying drawings, it will be manifest that a candy machine is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

1. A candy machine including a supporting frame structure; a main rock shaft mounted in said supporting frame structure; a second rock shaft mounted in said supporting frame structure at right angles to the first mentioned rock shaft; a pair of drums having mould sections adapted to register for producing successive complete candy moulds; operating means for said drums; an automatic feed mechanism for feeding handles to position opposite said moulds; link connections between said rock shafts; means actuated by the drum operating means to rock said main rock shaft as each successive complete mould is produced by registration of the mould sections of said drums; and reciprocating means actuated by the second rock shaft to force a handle from said automatic feed mechanism into each complete mould as the latter is produced.

2. A candy machine including a supporting frame structure; a main rock shaft mounted in said structure; a pair of geared drums having mould sections adapted to register for producing successive complete candy moulds; means for rotating said drums; a pawl carried on one end of said main rock shaft; a ratchet wheel carried by the operating means for said drums to actuate said pawl and thus rock the main rock shaft on each registration of mould sections of said drums; handle feeding mechanism; operative connections between said handle feeding mechanism and said main rock shaft; a second rock shaft at right angles to the said main rock shaft; link connections between said rock shafts; and reciprocating means actuated by the second mentioned rock shaft to drive a handle from said handle feeding mechanism to each of the complete candy moulds as the latter are produced.

3. A candy machine including a supporting frame structure; a pair of superposed drums having mould sections adapted to register successively to produce complete candy moulds; a main rock shaft extended horizontally beneath the lowermost of said drums; said main rock shaft and the supporting shafts for said drums being journalled in said supporting frame structure; a handle feeding mechanism supported on said supporting frame structure above said drums; control means for said handle feeding mechanism to release handles therefrom as the main rock shaft is rocked; means for rotating said drums in unison; actuating means for said main rock shaft to rock the latter on each registration of mould sections of said drums to produce a complete candy mould; a second rock shaft at right angles to said main rock shaft and mounted on said supporting frame structure; link connections between said rock shafts; and reciprocating means actuated by the second mentioned rock shaft to successively drive the handles into the respective complete moulds as the latter are produced by registration of mould sections from said drums.

In testimony whereof I hereunto affix my signature.

FRED PARNELL. [L. S.]